US008509694B2

(12) United States Patent
Rathi et al.

(10) Patent No.: US 8,509,694 B2
(45) Date of Patent: Aug. 13, 2013

(54) TECHNIQUES FOR FACILITATING COMMUNICATION BETWEEN A PORTABLE MEDIA DEVICE AND AN ACCESSORY USING MULTIPLE COMMUNICATION PATHS

(75) Inventors: Shailesh Rathi, San Jose, CA (US); Peter Langenfeld, Belmont, CA (US); Lawrence Bolton, Fremont, CA (US)

(73) Assignee: Apple Inc., Cupertino, CA (US)

( * ) Notice: Subject to any disclaimer, the term of this patent is extended or adjusted under 35 U.S.C. 154(b) by 372 days.

(21) Appl. No.: 12/893,719

(22) Filed: Sep. 29, 2010

(65) Prior Publication Data

US 2012/0052807 A1    Mar. 1, 2012

Related U.S. Application Data (60) Provisional application No. 61/378,790, filed on Aug. 31, 2010.

(51) Int. Cl.
*H04B 7/00* (2006.01)

(52) U.S. Cl.
USPC ........................................ 455/41.3; 455/41.2

(58) Field of Classification Search
USPC .............................................. 455/41.2, 41.3
See application file for complete search history.

(56) References Cited

U.S. PATENT DOCUMENTS

| | | | |
|---|---|---|---|
| 5,884,191 A | 3/1999 | Karpus et al. | |
| 7,471,200 B2 * | 12/2008 | Otranen | ................ 340/572.1 |
| 7,549,008 B2 | 6/2009 | Kalayjian | |
| 7,685,293 B2 | 3/2010 | Deshpande et al. | |
| 8,037,097 B2 | 10/2011 | Guo et al. | |
| 2005/0119001 A1 * | 6/2005 | Watanabe | ................... 455/436 |
| 2006/0258289 A1 * | 11/2006 | Dua | ......................... 455/41.3 |
| 2006/0274685 A1 * | 12/2006 | Johnson et al. | ............. 370/328 |
| 2007/0124439 A1 * | 5/2007 | Shah et al. | ..................... 709/223 |
| 2007/0130290 A1 * | 6/2007 | van der Winkel | ............ 709/219 |
| 2007/0171936 A1 * | 7/2007 | Hazra et al. | ................... 370/465 |
| 2007/0248311 A1 | 10/2007 | Wice et al. | |
| 2008/0074996 A1 * | 3/2008 | Fourcand | ...................... 370/225 |
| 2008/0220788 A1 * | 9/2008 | Stanwood et al. | ............ 455/450 |
| 2008/0232299 A1 * | 9/2008 | Mosig | .......................... 370/328 |
| 2009/0003620 A1 | 1/2009 | McKillop et al. | |
| 2009/0061769 A1 | 3/2009 | Zimbric et al. | |
| 2009/0111378 A1 * | 4/2009 | Sheynman et al. | .......... 455/41.1 |

(Continued)

OTHER PUBLICATIONS

Search/Examination Report dated Jan. 26, 2012 from International Patent Application No. PCT/US2011/048459, 16 pages.

*Primary Examiner* — Gennadiy Tsvey
(74) *Attorney, Agent, or Firm* — Kilpatrick Townsend & Stockton LLP (57) ABSTRACT

Techniques for facilitating communication between a portable media device (PMD) and an accessory via multiple communication paths. In one set of embodiments, an accessory can be coupled with a PMD via a first connection, thereby establishing a first control communication path. The accessory can send to the PMD, via the first control communication path, an enumeration of the communication paths supported by the accessory. The enumerated communication paths can include control communication paths and data (e.g., audio or video) communication paths. The accessory can further send, to the PMD via the first control communication path, an availability status of each data communication path. In response, the PMD can select, based on a routing policy, one or more of the data communication paths and can notify the accessory of the selected data communication path. The PMD and accessory can then interoperate by exchanging data signals over the selected data communication path.

16 Claims, 7 Drawing Sheets

(56) References Cited

U.S. PATENT DOCUMENTS

| | | |
|---|---|---|
| 2009/0154389 A1* | 6/2009 | Srikrishna et al. ............ 370/312 |
| 2009/0156122 A1 | 6/2009 | Dayan |
| 2009/0158301 A1 | 6/2009 | Holan et al. |
| 2009/0186581 A1 | 7/2009 | Griffin, Jr. et al. |
| 2009/0191914 A1* | 7/2009 | Stahl ............................ 455/557 |
| 2009/0221271 A1* | 9/2009 | Soma et al. ................ 455/414.1 |
| 2010/0075604 A1 | 3/2010 | Lydon et al. |
| 2010/0159948 A1 | 6/2010 | Spivey et al. |
| 2011/0271106 A1 | 11/2011 | Hinkle et al. |
| 2011/0306301 A1* | 12/2011 | Lubetzky et al. .............. 455/62 |

* cited by examiner

TECHNIQUES FOR FACILITATING COMMUNICATION BETWEEN A PORTABLE MEDIA DEVICE AND AN ACCESSORY USING MULTIPLE COMMUNICATION PATHS

CROSS-REFERENCE TO RELATED APPLICATIONS

The present application claims the benefit and priority under 35 U.S.C. 119(e) from U.S. Provisional Application No. 61/387,790, entitled "TECHNIQUES FOR FACILITATING COMMUNICATION BETWEEN A PORTABLE MEDIA DEVICE AND AN ACCESSORY USING MULTIPLE COMMUNICATION PATHS" filed Aug. 31, 2010, the entire contents of which are herein incorporated by reference for all purposes.

BACKGROUND

The present disclosure relates in general to portable media devices that can interoperate with accessories, and in particular to interoperation of a portable media device with an accessory via multiple communication paths.

A portable media device generally refers to a handheld device that is capable of managing and/or playing back media assets such as audio, video, and still image files. Some portable media devices, such as the iPod®, iPhone™, and iPad™ available from Apple Inc. of Cupertino, Calif., can provide users a variety of services in addition to media management and playback. Examples of such services include the storage of personal data such as calendar, contacts, and notes; Internet access; mobile telephony; and the ability to selectively download and run various application programs.

A portable media device typically includes a number of connectors or ports that can be used to interface with other devices. For instance, one connector or port can be used to establish a connection between the portable media device and a host computer for transferring data to/from the host computer. Another (or the same) connector or port can be used to establish a connection between the portable media device and an accessory device (referred to herein as an accessory) for, e.g., playing back or presenting media assets stored on the portable media device.

Some accessories are capable of interfacing with a portable media device via multiple connectors or ports of the portable media device. These accessories can be composed of a single physical device, or a number of separate physical devices that are designed to be components of a single logical device. For example, an accessory can be composed of a car head unit and a hands-free headset that are designed to be part of a single audio system. The car head unit can be capable of interfacing with a portable media device via a wired connection (e.g., 30-pin serial, USB, etc.) as well as via a wireless connection (e.g., Bluetooth). At the same time, the hands-free headset can be capable of interfacing with the portable media device via another wireless connection.

In situations such as the foregoing where an accessory can potentially interface with a portable media device via many connections, there is no protocol for informing the portable media device that the various connections to the accessory are associated (i.e., all route to the same logical accessory). The portable media device assumes that each connection (and each communication path in the connection) is separate and independent of any other. As a result, the portable media device cannot interoperate with the accessory to perform routing of information over the multiple connections/communication paths.

BRIEF SUMMARY

Embodiments of the present invention provide techniques for facilitating communication between a portable media device (PMD) and an accessory via multiple communication paths. In one set of embodiments, an accessory can be coupled with a PMD via a first connection, thereby establishing a first control communication path. The accessory can send to the PMD, via the first control communication path, an enumeration of the communication paths supported by the accessory. The enumerated communication paths can include control communication paths and data (e.g., audio or video) communication paths. The accessory can further send, to the PMD via the first control communication path, an availability status of each data communication path. In response, the PMD can select, based on a routing policy, one or more of the data communication paths and can notify the accessory of the selected data communication path. The PMD and accessory can then interoperate by exchanging data signals over the selected data communication path. In this manner, the PMD can keep track of the communication paths to the accessory and can select a particular data communication path for routing data to the accessory.

In a further set of embodiments, the accessory can be coupled with the PMD via a second connection distinct from the first connection, thereby establishing a second control communication path. The accessory can send to the PMD, via the second control communication path, the same enumeration of communications paths sent over the first control communication path. In response, the PMD can compare the enumerations received over the first and second control communication paths and determine, based on the comparison, that the first and second control communication paths are connected to the same logical accessory.

In certain embodiments, while interoperating with the PMD, the accessory can detect a state change that affects one or more of its data communication paths. Upon detecting such a change, the accessory can send to the PMD an updated availability status of each data communication path. In addition, while interoperating with the accessory, the PMD can determine that a data stream should be re-routed from a first data communication path to a second data communication path. Upon making such a determination, the PMD can send a notification to the accessory indicating that the second data communication path is to be used for future data communication.

A further understanding of the nature and advantages of the embodiments disclosed herein can be realized by reference to the remaining portions of the specification and the attached drawings.

DETAILED DESCRIPTION

In the following description, for the purposes of explanation, numerous details are set forth in order to provide an understanding of various embodiments of the present invention. It will be apparent, however, to one skilled in the art that certain embodiments can be practiced without some of these details.

Embodiments of the present invention provide techniques for facilitating communication between a portable media device (PMD) and an accessory via multiple communication paths. In one set of embodiments, an accessory can be coupled with a PMD via a first connection, thereby establishing a first control communication path. The accessory can send to the PMD, via the first control communication path, an enumeration of the communication paths supported by the accessory. The enumerated communication paths can include control communication paths and data (e.g., audio or video) communication paths. The accessory can further send, to the PMD via the first control communication path, an availability status of each data communication path. In response, the PMD can select, based on a routing policy, one or more of the data communication paths and can notify the accessory of the selected data communication path. The PMD and accessory can then interoperate by exchanging data signals over the selected data communication path. In this manner, the PMD can keep track of the communication paths to the accessory and can select a particular data communication path for routing data to the accessory.

In a further set of embodiments, the accessory can be coupled with the PMD via a second connection distinct from the first connection, thereby establishing a second control communication path. The accessory can send to the PMD, via the second control communication path, the same enumeration of communications paths sent over the first control communication path. In response, the PMD can compare the enumerations received over the first and second control communication paths and determine, based on the comparison, that the first and second control communication paths are connected to the same logical accessory.

In certain embodiments, while interoperating with the PMD, the accessory can detect a state change that affects one or more of its data communication paths. Upon detecting such a change, the accessory can send to the PMD an updated availability status of each data communication path. In addition, while interoperating with the accessory, the PMD can determine that a data stream should be re-routed from a first data communication path to a second data communication path. Upon making such a determination, the PMD can send a notification to the accessory indicating that the second data communication path is to be used for future data communication.

Figure 1:
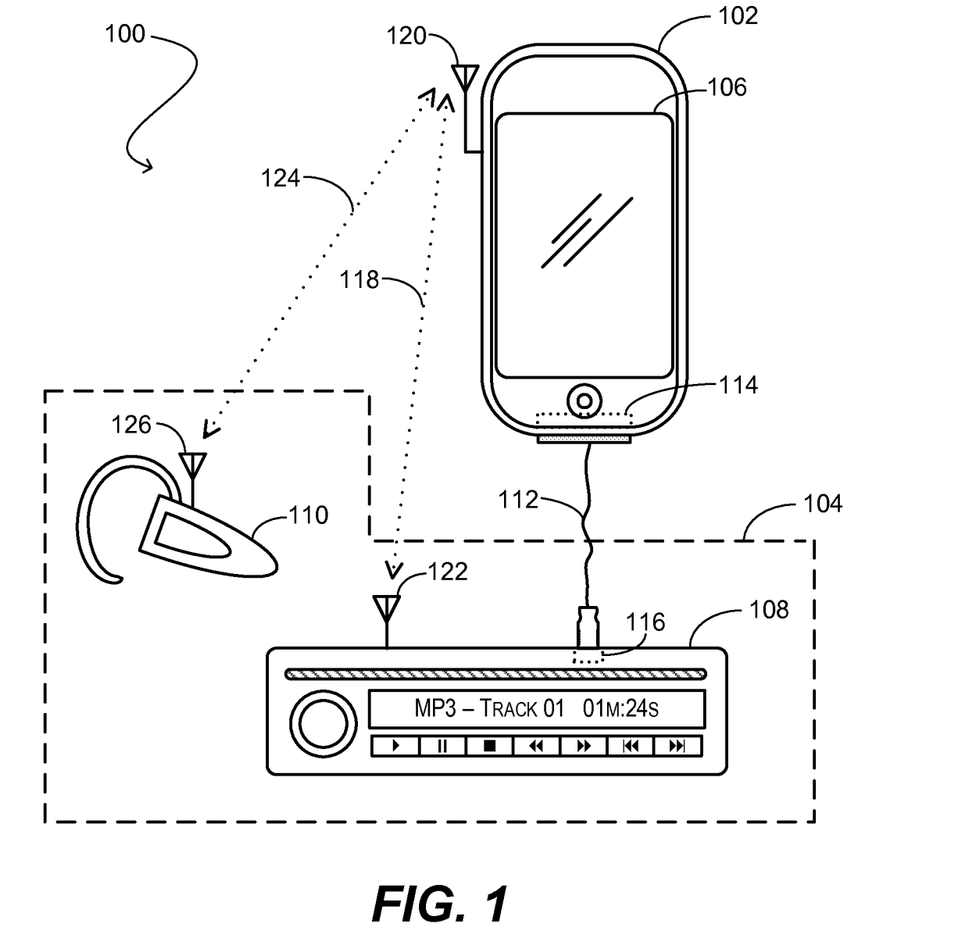
FIG. 1 is a simplified illustration of a system according to an embodiment of the present invention.

FIG. 1 is a simplified illustration of a system 100 according to an embodiment of the present invention. As shown, system 100 can include a portable media device (PMD) 102 and an accessory 104. PMD 102 can be any handheld device that is capable of storing and playing back digital media assets such as audio, video, and/or still image files. In a particular embodiment, PMD 102 can be an iPod®, iPhone™, or iPad™ (available from Apple Inc. of Cupertino, Calif.). PMD 102 can include a user interface comprising user input and/or output devices such as touch-screen display 106. PMD 102 can also include any number of other user input and/or output devices such as scroll wheels, buttons, keyboards, trackballs, touchpads, microphones, speakers, and the like.

PMD 102 can provide a variety of services to a user, such as the management and playback of media assets, mobile telephony and Internet access (e.g., via wireless connections such as Wi-Fi and/or wireless data networks using EDGE, 3G, or 4G technology), and execution of various application programs that can be installed on PMD 102 by the user. In certain embodiments, PMD 102 can provide one or more services that entail the transmission of control and/or data signals to an accessory such as accessory 104.

Accessory 104 can be any type of electronic device that is capable of communicating with PMD 102. In one set of embodiments, accessory 104 can be composed of separate physical devices (e.g., a car head unit 108 and a hands-free headset 110) that are designed to be components of a single logical device. For example, car head unit 108 can be designed to interoperate with headset 110 as part of a single audio system when both are connected to PMD 102. Similarly, headset 110 can be designed to interoperate with car head unit 108 as part of a single audio system when both are connected to PMD 102. In alternative embodiments, accessory 104 can be composed of a single physical device.

As shown in FIG. 1, accessory 104 can interface with PMD 102 via multiple connections. For example, car head unit 108 can interface with PMD via a wired connection 112 (e.g., serial, USB, etc.) between a media device connector 114 of PMD 102 and an accessory connector 116 of car head unit 108, as well as via a wireless connection 118 (e.g., Bluetooth) between a wireless port/antenna 120 of PMD 102 and a wireless port/antenna 122 of car head unit 108. In addition, headset 110 can interface with PMD 102 via another wireless connection 124 between wireless port/antenna 120 of PMD 102 and a wireless port/antenna 126 of headset 110. Although only three connections are depicted between accessory 104 and PMD 102, any number of connections can be supported.

Each connection 112, 118, 124 can include one or more control and/or data communication paths between accessory 104 and PMD 102. As used herein, a control communication path is a signaling path that can carry commands for controlling a device such as PMD 102 or accessory 104. A data communication path is a signaling path that can carry digital and/or analog data signals such as audio, video, and the like.

In current implementations, when PMD 102 and accessory 104 are coupled via multiple connections as shown in FIG. 1, PMD 102 generally has no way of knowing that connections 112, 118, 124 all connect to the same logical accessory. PMD 102 assumes that each connection (and each communication path in the connection) is separate and independent of each other. As a result, PMD 102 cannot interoperate with accessory 104 in a manner that enables intelligent routing of data signals over one or more of the connections.

For example, consider a situation where car head unit 108 has initially established a first audio communication path and a control communication path to PMD 102 via wired connection 112, such that audio data from PMD 102 is sent to car head unit 108 over the first audio communication path and control signals from car head unit 108 (e.g., play, pause, fast forward, etc.) are sent to PMD 102 over the control communication path. If headset 110 subsequently establishes a second audio communication path with PMD 102 via wireless connection 124, it may be desirable to automatically re-route the audio data from the first audio communication path to the second audio communication path, while allowing car head unit 108 to continue to control PMD 102 via the control communication path. Further, if the second audio communication path subsequently becomes unavailable (e.g., headset 110 is turned off), it may be desirable to automatically re-route the audio data back to the first audio communication path. This type of intelligent routing cannot be supported if PMD 102 is unaware that the various control/audio communication paths between PMD 102, car head unit 108, and headset 110 are part of the same logical system.

Embodiments of the present invention address this by enabling accessory 104 (e.g., car head unit 108 and headset 110) to enumerate to PMD 102 all of its supported communication paths upon connecting (via any connection) to PMD 102. For instance, upon establishing a control communication path to PMD 102 via wired connection 112, car head unit 108 can enumerate all of the possible control and data communication paths over connections 112, 118, and 124. Car head unit 108 can also indicate to PMD 102 the availability status of each data communication path. Based on this information, PMD 102 can associate the various communication paths to accessory 104 and make informed decisions about how to route data to car head unit 108 or headset 110.

If headset 110 subsequently connects to PMD 102 via wireless connection 124, headset 110 can send to PMD 102 the same enumeration information sent by car head unit 108. In response, PMD 102 can recognize that the enumerated communication paths for headset 110 and car head unit 108 are the same, and thus can determine that the two devices are part of the same logical accessory. Alternatively, headset 110 can send to PMD 102 some other information (e.g., a unique identifier) that identifies the headset as being part of the same logical accessory as car head unit 108. Specific processing that can be performed by PMD 102 and accessory 104 to achieve this functionality is described in greater detail with respect to FIGS. 3-8 below.

It should be appreciated that system 100 is illustrative and not intended to limit embodiments of the present invention. For example, a variety of different types of PMDs and accessories can be used. One of ordinary skill in the art will recognize many variations, modifications, and alternatives.

Figure 2:
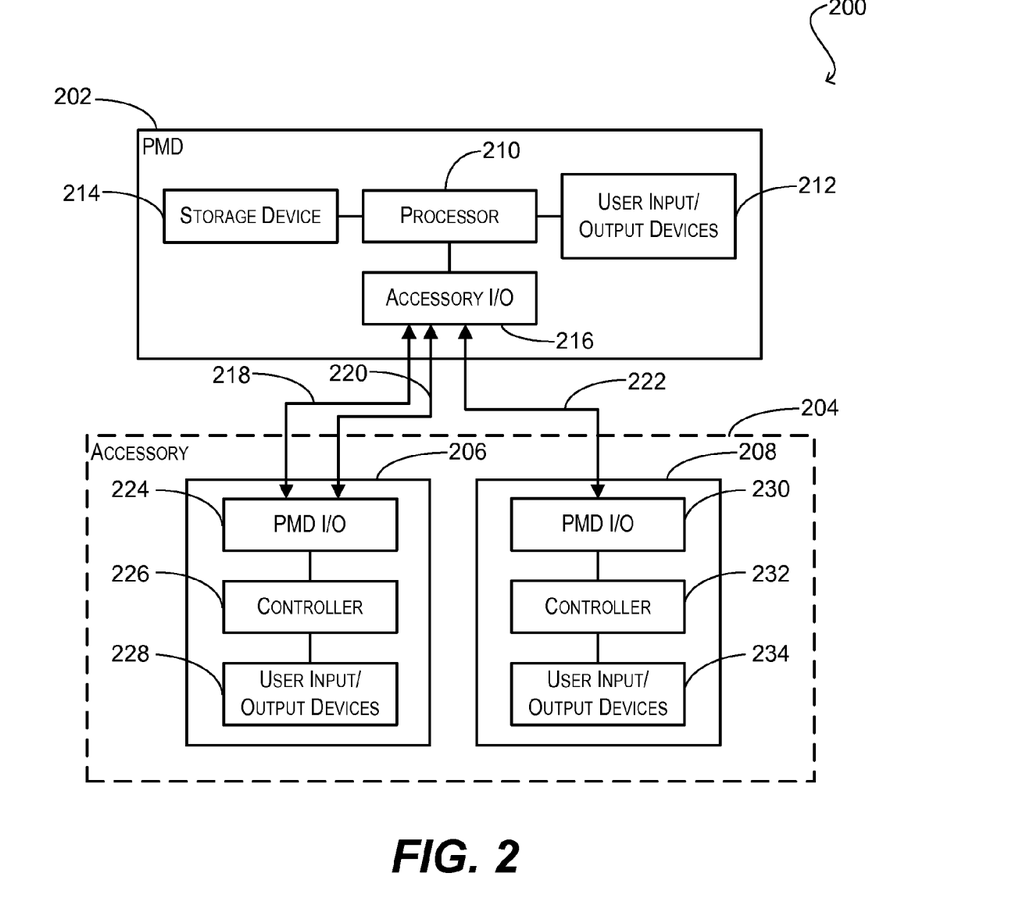
FIG. 2 is a simplified block diagram of a system according to an embodiment of the present invention.

FIG. 2 is a simplified block diagram of a system 200 according to an embodiment of the present invention. As shown, system 200 can include a PMD 202 and an accessory 204 composed of a first device 206 and a second device 208. In one set of embodiments, system 200 can implement system 100 of FIG. 1. For example, PMD 202 can implement PMD 102, accessory 204 can implement accessory 104, device 206 can implement car head unit 108, and device 208 can implement headset 110.

PMD 202 can include a processor 210, user input/output devices 212, a storage device 214, and an accessory I/O (input/output) interface 216.

Processor 210 can be implemented as one or more integrated circuits, such as a microprocessor or microcontroller. In a particular embodiment, processor 210 can be a microprocessor that uses the ARM architecture (a RISC architecture designed by ARM Limited). Processor 210 can be responsible for carrying out one or more operations of PMD 202. For example, processor 210 can select and play media assets or execute various application programs stored in storage device 214. Processor 210 can also manage communication with accessories (e.g., accessory 204) via accessory I/O interface 216.

User input/output devices 212 can be any of a number of devices that allow a user to interact with PMD 202. For example, as discussed with respect to PMD 102 of FIG. 1, such user input/output devices can include scroll wheels, buttons, keyboards, trackballs, microphones, speakers, touch-screen displays, and so on. In various embodiments, the user can operate a particular user input device 212 to invoke the functionality of PMD 202. In addition, a user can view and/or hear output from PMD 202 via a particular user output device 212.

Storage device 214 can be implemented, for example, using magnetic disk, flash memory, and/or any other non-volatile storage medium. In some embodiments, storage device 214 can include non-removable storage components such as a non-removable hard disk drive or flash memory drive. In other embodiments, storage device 214 can include removable storage media such as flash memory cards. Storage device 214 can provide storage for any programs and/or data used by PMD 202. For example, storage device 214 can store media assets such as audio, video, still images, or the like, and associated metadata (e.g., asset name, artist, title, genre, playlists, etc.). Storage device 214 can also store information other than media assets, such as information about a user's contacts (names, addresses, phone numbers, etc.); scheduled appointments and events; notes; and/or other personal information. In still other embodiments, storage device 214 can store one or more programs to be executed by processor 210, such as video game programs, personal information management programs, programs for playing media assets and/or navigating a media asset database, and so on.

Accessory I/O interface 216 can include a number of signal paths configured to carry various signals between PMD 202 and accessory 204. In one set of embodiments, accessory I/O interface 216 can include a wired interface such as the 30-pin serial connector used on the iPod®, iPhone™, and iPad™. Alternatively or additionally, accessory I/O interface 216 can include a wireless interface (e.g., Bluetooth or the like). In certain embodiments, accessory I/O interface 216 can support multiple concurrent connections between PMD 202 and accessory 204. For example, as shown in FIG. 2, device 206 of accessory 204 can connect to accessory I/O interface 216 via connections 218 and 220, and device 208 of accessory 204 can connect to accessory I/O interface 216 via connection 222. Although only three connections are depicted, any number of connections can be supported.

Like accessory 104 of FIG. 1, accessory 204 can be composed of separate physical devices (device 206 and 208) that are designed to act in concert as a single logical device. Alternatively, accessory 204 can be composed of a single physical device. Each device of accessory 204 can include a controller 226/232, a PMD I/O interface 224/230, and user input/output devices 228/234.

Controllers 226, 232 can be implemented as one or more integrated circuits, such as a microprocessor or microcontroller. In various embodiments, controllers 226, 232 can control the operation of corresponding devices 206, 208. Controllers 226, 232 can also manage communication with PMD 202 via PMD I/O interfaces 224, 230.

User input/output devices 228, 234 can be any of a number of devices that allow a user to interact with accessory 204. Such user input/output devices can include scroll wheels, buttons, keyboards, trackballs, microphones, speakers, touch-screen displays, and so on. In various embodiments, the user can view and/or hear output from PMD 202 that is routed to device 206 or 208 via a particular user output device 228, 234.

Each PMD I/O interface 224/230 can include a number of signal paths configured to carry various signals between device 206/208 and PMD 202. In one set of embodiments, PMD I/O interface 224/230 can include a wired interface such as the 30-pin serial connector used on the iPod®, iPhone™, and iPad™. Alternatively or additionally, PMD I/O interface 224/230 can include a wireless interface (e.g., Bluetooth or the like).

In various embodiments, PMD I/O interface 224/230 and accessory I/O interface 216 can allow accessory 204 and PMD 202 to be in a "connected" or "disconnected" state. As used herein, accessory 204 and PMD 202 are connected whenever a communication path between PMD I/O interface 224/230 and accessory I/O interface 216 is open. Conversely, accessory 204 and PMD 202 are disconnected whenever the communication path is closed. Connection can be achieved by physical attachment (e.g., between respective mating connectors of accessory 204 and PMD 202), by an indirect connection such as a cable, or by establishment of a wireless connection. Similarly, disconnection can be achieved by physical detachment, disconnecting a cable, powering down accessory 204 or PMD 202, or closing the wireless connection.

A variety of connections between PMD I/O interface 224/230 and accessory I/O interface 216 can be used, including wired connections such as USB, FireWire, or universal asynchronous receiver/transmitter ("UART"), and wireless connections such as Bluetooth, WiFi, infrared, or the like. As noted above, in certain embodiments multiple connections (e.g., 218, 220, 222) can be established concurrently between accessory 204 and PMD 202, where each connection includes one or more control communication paths and/or data communication paths for exchanging control and/or data signals.

It should be appreciated that system 200 is illustrative and not intended to limit embodiments of the present invention. For example, PMD 202 and accessory 204 may each have other capabilities or include other components that are not specifically described. One of ordinary skill in the art will recognize many variations, modifications, and alternatives.

In one set of embodiments, PMD 202 and accessory 204 can communicate by exchanging commands and data according to a communications protocol. An example of such a protocol is the iPod® Accessory Protocol (iAP) developed by Apple Inc. According to one aspect, the protocol can define a format for messages transmitted between PMD 202 and accessory 204. For instance, the protocol can specify that each message is sent in a packet with a header and an optional payload. The header can provide basic information such as a start indicator, length of the packet, and a command to be processed by the recipient. The payload can provide data associated with the command. In some embodiments, the amount of associated data can be different for different commands, and some commands can provide for variable-length payloads.

According to another aspect, the protocol can define a number of "lingoes," where a "lingo" refers generally to a group of related commands. In one embodiment, a command can be uniquely identified by a first byte identifying the lingo to which the command belongs and a second byte identifying the particular command within the lingo. Other command structures may also be used. It is not required that all accessories, or all host devices to which an accessory can be connected, support every lingo defined within the protocol or every command of a particular lingo (for instance, different devices might use different versions of a given lingo).

In one set of embodiments, the protocol can include a general lingo that enables certain core communication functions between PMD 202 and accessory 204. For example, the general lingo can include commands enabling PMD 202 and accessory 204 to identify themselves to each other and to provide information about their respective capabilities, including which (if any) other lingoes each supports and which capabilities of the other device each intends to use while connected. The general lingo can also include authentication commands that PMD 202 can use to verify the purported identity and capabilities of accessory 204 (or vice versa). In some cases, accessory 204 (or PMD 202) can be blocked from invoking certain commands or lingoes if the authentication is unsuccessful.

In further embodiments, the protocol can include one or more accessory lingoes that are used to support communication between a PMD and various different classes of accessories. Examples of such accessory lingoes include an RF tuner lingo, a remote control lingo, an extended interface lingo, and so on. In a particular embodiment, the protocol can include an accessory lingo that supports interoperation between PMD 202 and accessory 204 for routing data via multiple communication paths. The commands that can be included in this lingo are discussed in greater detail with respect to FIGS. 3-8 below.

It should be appreciated that the protocol (and associated lingoes and commands) described above is illustrative and not intended to limit embodiments of the present invention. For example, some of the commands can be replaced with other commands or a combination of commands. Further, some of the lingoes and/or commands may not be supported by particular host devices or accessories. One of ordinary skill in the art will recognize many variations, modifications, and alternatives.

Further it should be appreciated that the phrases "sending a command" and "receiving a command" can be interpreted broadly to include any exchange of commands. Thus, while the term "command" is sometimes used for a low-level atomic transaction, it can also be used to refer to high-level operations that include multiple low-level commands.

As described above, embodiments of the present invention provide techniques for facilitating communication between a portable media device (e.g., PMD 202 of FIG. 2) and an accessory (e.g., accessory 204 of FIG. 2) via multiple communication paths. In one set of embodiments, an accessory sends to a PMD an enumeration of the control and data communication paths supported by the accessory. The accessory can further send to the PMD an availability status of each data communication path. In response, the PMD can select, based on a routing policy, one or more of the data communication paths, and the PMD and accessory can interoperate by exchanging data signals over the selected data communication path. In this manner, the PMD can keep track of the communication paths to the accessory and can select a particular data communication path for routing data to the accessory.

Figure 3:
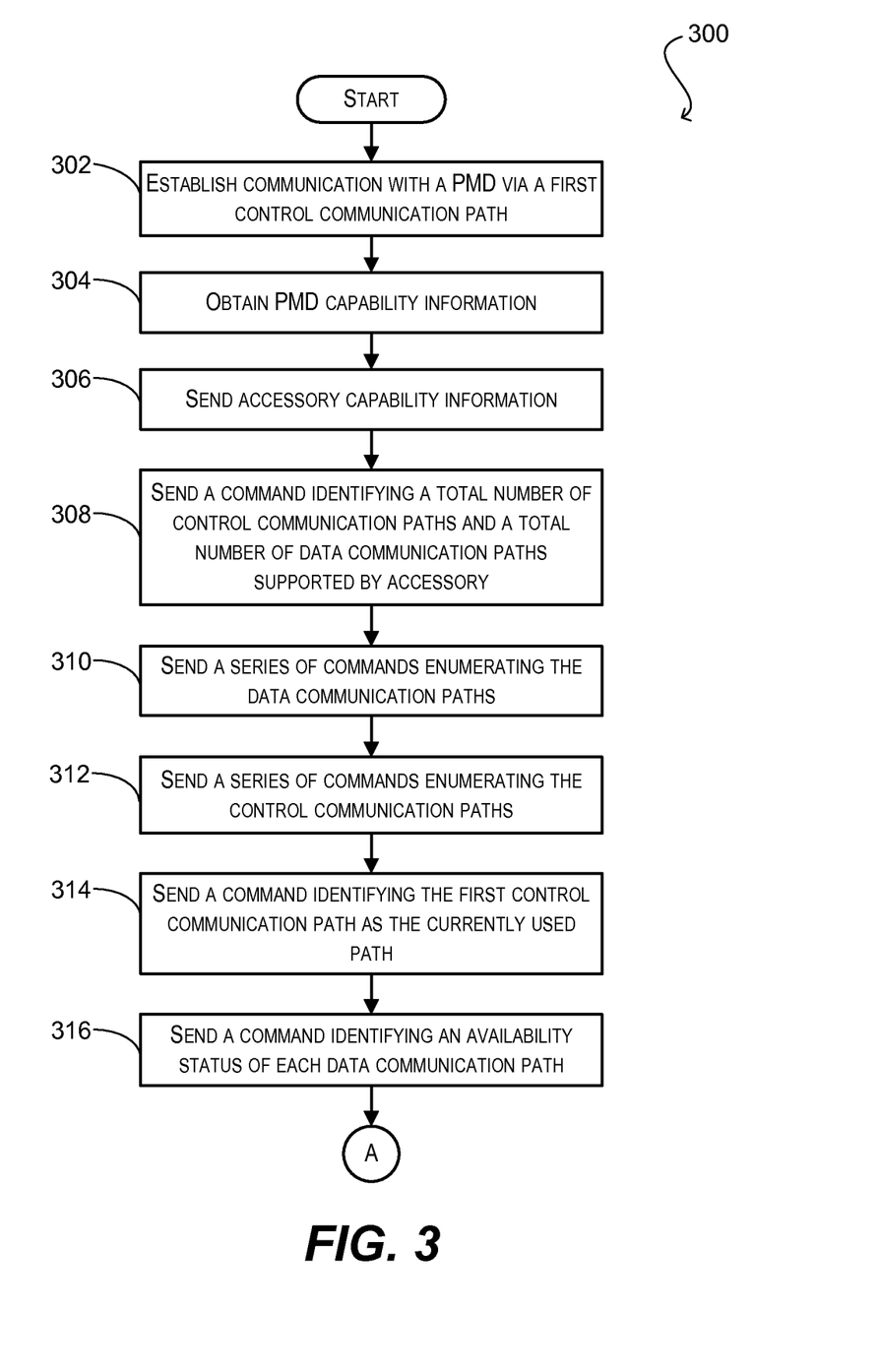
FIG. 3 is a flow diagram of a process performed by an accessory upon connecting to a portable media device via a first connection according to an embodiment of the present invention.

FIG. 3 is a flow diagram of a process 300 that can be performed by accessory 204 upon connecting to PMD 202 via a first connection according to an embodiment of the present invention. In a particular embodiment, process 300 can be performed by accessory 204 as part of an initialization sequence prior to engaging in normal operation with PMD 202. Process 300 can be implemented by accessory 204 in hardware, software, or a combination thereof. As software, process 300 can be encoded as program code stored on a machine-readable storage medium.

At block 302, accessory 204 can connect to PMD 202 via a first connection (e.g. connection 218, 220, or 222) and thereby establish a first control communication path with PMD 202. In one set of embodiments, this can include identifying and/or authenticating PMD 202 using the general lingo of the communications protocol described above. Since accessory 204 of FIG. 2 is composed of separate physical devices 206 and 208, block 302 (as well as any other process step described herein as being attributable to accessory 204) can be performed by either device 206 or 208 of accessory 204.

At block 304, accessory 204 can obtain, via the first control communication path, capability information from PMD 202. For example, accessory 204 can obtain information indicating whether PMD 202 supports routing of data over multiple communication paths. In some embodiments, process 300 can be aborted by accessory 204 if PMD 202 does not have this specific capability.

In response to receiving the capability information at block 302, accessory 204 can send, via the first control communication path, its own capability information to PMD 202 (block 306). For example, accessory 204 can send information indicating that it supports routing of data over multiple communication paths.

At block 308, accessory 204 can send, via the first control communication path, a command indicating the total number of control communication paths and the total number of data communication paths supported by the accessory. In other words, this command can quantify all of the control communication paths and data communication paths accessory 204 can potentially use for communicating with PMD 202. With respect to system 200 of FIG. 2, these totals would include the communication paths included in connections 218, 220, and 222. Thus, e.g., if each of 218, 220, and 222 includes one control communication path and two data communication paths, the total number of control communication paths supported by accessory 204 would be three and the total number of data communication paths supported by accessory 204 would be six.

In certain embodiments, the command sent at block 308 can also include information indicating a predefined class for accessory 204 (e.g., speaker, headset, microphone, display, etc.).

At block 310, accessory 204 can send, via the first control communication path, a series of commands to PMD 202 enumerating the data communication paths that it is designed to support. For example, accessory 204 can send one command for each data communication path, where the command includes a predetermined numerical index for the path.

In one set of embodiments, the enumeration can begin at zero and increment up by one for each data communication path. In other embodiments, the enumeration can begin at any number and can be incremented by any value. In certain embodiments, this enumeration can be stored by accessory 204 and used for future communications with PMD 202. For example, accessory 204 can use the index of each data communication path to provide an availability status of the path to PMD 202, as well as to receive information from PMD 202 regarding the currently used path (described in further detail below).

In addition to a numerical index, the series of commands sent at block 310 can also include other information pertaining to each data communication path. As one example, the series of commands can include a human-readable name for each path (e.g., for display to a user of PMD 202 or accessory 204). As another example, the series of commands can include an identifier that is unique to the accessory or to the connection associated with each path. For wired connections, the identifier can be based on, e.g., an authentication ID serial number assigned to the accessory. For wireless connections, the identifier can be based on, e.g., a MAC address of a Bluetooth or WiFi port of the accessory.

As yet another example, the series of commands can include audio and/or video-related settings for each data communication path. For instances, if a particular path is an audio path, the command for that path can include fields specifying the type of the audio path (e.g., line in, line out, USB audio out from PMD, USB audio in to PMD, A2DP out, HFP, etc.), whether auto-play should be enabled, whether the audio path supports volume control, the sample rates supported by the audio path, and the like. If a particular path is a video path, the command for that path can include fields specifying the type of the video path (e.g., DisplayPort, HDMI, etc.), the resolutions/video timings supported by the video path, the color depths supported by the video path, and the like.

Once accessory 204 has enumerated its data communication paths, accessory 204 can send, via the first control communication path, a series of commands enumerating its control communication paths (block 312). For example, accessory 204 can send one command for each control communication path, where the command includes a predetermined numerical index for the path. Like the enumeration of data communication paths, the enumeration of the control communication paths can begin at zero and increment up by one for each control communication path. In other embodiments, the enumeration can begin at any number and can be incremented by any value. In certain embodiments, this enumeration can be stored by accessory 204 and used for future communications with PMD 202.

In some embodiments, the series of commands sent at block 312 can further include, for each control communication path, a type of the path (e.g., USB, serial, Bluetooth, etc.) and an identifier that is unique to the accessory or to the connection associated with the path. For wired connections, the identifier can be based on, e.g., an authentication ID serial number assigned to the accessory. For wireless connections, the identifier can be based on, e.g., a MAC address of a Bluetooth or WiFi port of the accessory.

In one set of embodiments, all control communication paths can be considered broadcast paths. In these embodiments, a control signal sent by accessory 204 to PMD 202 (or vice versa) on a particular control communication path will act on the receiving device as a whole, and will not be confined to a specific connection or data communication path. In alternative embodiments, a control communication path can be linked to a data communication path, such that a control signal received on the control communication path will only affect the data stream being routed through the data communication path.

At block 314, accessory 204 can send, via the first control communication path, a command to PMD 202 identifying the control path it is currently communicating over (i.e., the first control communication path). In one set of embodiments, accessory 204 can reference the current control communication path based on the index enumerated at block 312.

At block 316, accessory 204 can send, via the first control communication path, a command to PMD 202 indicating an availability status of each data communication path. In this manner, PMD 202 can be made aware of which data communication paths are available for routing data to accessory 204. In one set of embodiments, accessory 204 can reference each data communication path based on the index enumerated at block 310.

In some embodiments, this command can also include an indication of whether one or more data communication paths are preferred by the accessory. PMD 202 can take this preference into account when making routing decisions.

Subsequently to block 316 (which, in certain embodiments, marks the end of the initialization process between accessory 204 and PMD 202), accessory 204 can receive a selection of a particular data communication path from PMD 202, and the PMD and accessory can interoperate by exchanging data signals over the selected data communication path. This further processing performed by accessory 204 (denoted by the "A" designator) is discussed with respect to FIG. 7 below.

It should be appreciated that process 300 is illustrative and that variations and modifications are possible. For example, although block 316 describes sending a command indicating the availability status (and "preferred" status) for each data communication path, a similar command can be sent that indicates the availability status (and "preferred" status) for each control communication path. Further, steps described as sequential may be executed in parallel, order of steps may be varied, and steps may be modified, combined, added, or omitted. One of ordinary skill in the art will recognize many variations, modifications, and alternatives.

Figure 4:
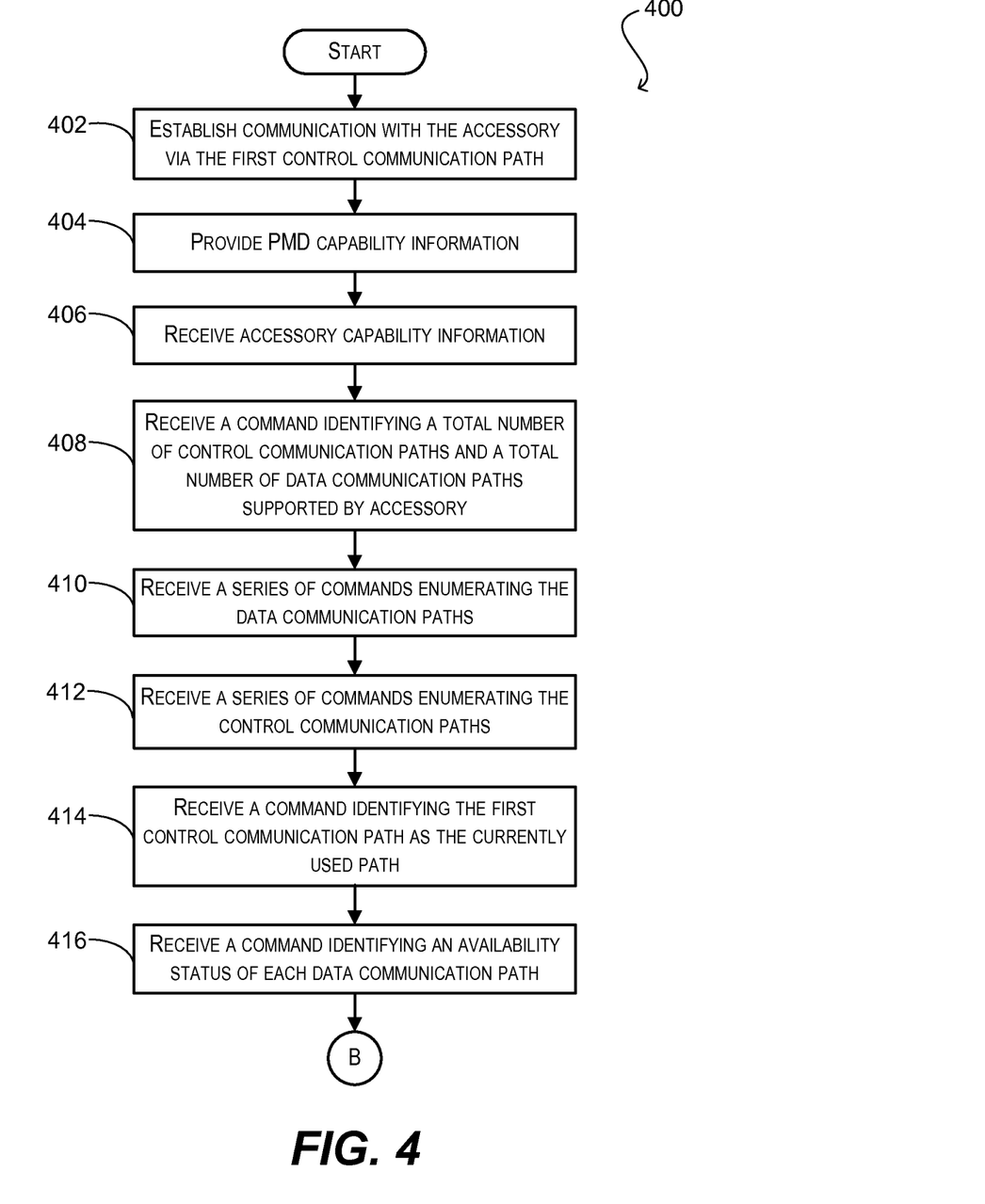
FIG. 4 is a flow diagram of a process performed by a portable media device upon connecting to an accessory via a first connection according to an embodiment of the present invention.

FIG. 4 is a flow diagram of a process 400 that can be performed by PMD 202 upon connecting to accessory 204 via a first connection according to an embodiment of the present invention. In one set of embodiments, process 400 can be performed by PMD 202 while process 300 is being performed by accessory 204. In a particular embodiment, process 400 can be performed by PMD 202 as part of an initialization sequence prior to engaging in normal operation with accessory 204. Process 400 can be implemented by PMD 202 in hardware, software, or a combination thereof. As software, process 400 can be encoded as program code stored on a machine-readable storage medium.

At block 402, PMD 202 can connect to accessory 204 via a first connection (e.g. connection 218, 220, or 222) and thereby establish a first control communication path with accessory 204. In one set of embodiments, this can include identifying and/or authenticating accessory 204 using the general lingo of the communications protocol described above.

At block 404, PMD 202 can provide, via the first control communication path, capability information to accessory 204. For example, PMD 202 can provide information indicating whether its supports routing of data over multiple communication paths. Further, PMD 202 receive, via the first control communication path, capability information from accessory 204 (block 406). For example, accessory 204 can send information indicating whether it supports routing of data over multiple communication paths. In some embodiments, process 400 can be aborted if accessory 204 does not have this specific capability.

At block 408, PMD 202 can receive, via the first control communication path, a command indicating the total number of control communication paths and the total number of data communication paths supported by accessory 204. In one set of embodiments, this command can correspond to the command sent by accessory 204 at block 308.

At blocks 410 and 412, PMD 202 can receive, via the first control communication path, first and second series of commands enumerating the data communication paths and the control communication paths supported by accessory 204. In one set of embodiments, these commands can correspond to the commands sent by accessory 204 at blocks 310 and 312. In a particular embodiment, these enumerations can be stored by PMD 202 and used for future communications with accessory 204. For example, PMD 202 can use the enumerated index of each data communication path to provide information to accessory 204 regarding the currently used path (described in further detail below).

At block 414, PMD 202 can receive, via the first control communication path, a command from accessory 204 indicating the currently used control path. In one set of embodiments, this command can correspond to the command sent by accessory 204 at block 314.

At 416, PMD 202 can receive, via the first control communication path, a command from accessory 204 indicating an availability status (as well as a preferred status) of each data communication path. In one set of embodiments, this command can correspond to the command sent by accessory 204 at block 316. In various embodiments, PMD 202 can use this information to make decisions on how to route data to accessory 204 during normal accessory operation. For example, PMD 202 can consult a routing policy and select an available data communication path for routing data to accessory 204. The PMD and accessory can then interoperate by exchanging data signals over the selected data communication path. This further processing performed by PMD 202 (denoted by the "B" designator) is discussed with respect to FIG. 8 below.

It should be appreciated that process 400 is illustrative and that variations and modifications are possible. For example, steps described as sequential may be executed in parallel, order of steps may be varied, and steps may be modified, combined, added, or omitted. One of ordinary skill in the art will recognize many variations, modifications, and alternatives.

Figure 5:
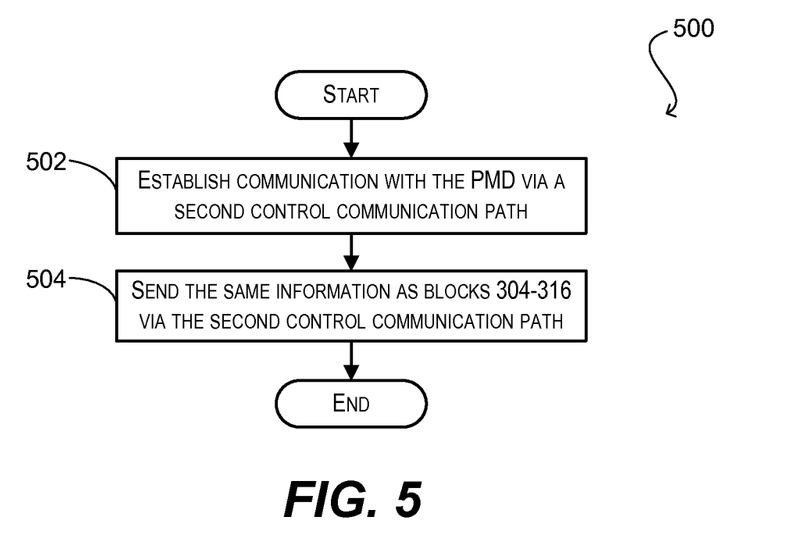
FIG. 5 is a flow diagram of a process performed by an accessory upon connecting to a portable media device via a second connection according to an embodiment of the present invention.

FIG. 5 is a flow diagram of a process 500 that can be performed by accessory 204 upon connecting to PMD 202 via a second connection according to an embodiment of the present invention. In one set of embodiments, process 500 can be performed by accessory 204 after it has already connected to PMD 202 via a first connection per process 300 of FIG. 3. Process 500 can be implemented by accessory 204 in hardware, software, or a combination thereof. As software, process 500 can be encoded as program code stored on a machine-readable storage medium.

At block 502, accessory 204 can connect to PMD 202 via a second connection that is distinct from the first connection made at block 302. For example, if accessory 204 previously connected to PMD 202 via connection 218, accessory 204 can connect to PMD 202 via connection 220 or 222. In this scenario, accessory 204 can establish a second control communication path to PMD 202 (as well as zero or more additional data communication paths).

At block 504, accessory 204 can send, via the second control communication path, the same (or substantially the same) information that was sent over the first control communication path at blocks 304-316 of FIG. 3. For example, accessory 204 can send the same enumeration of data and control communication paths sent at blocks 310 and 312. In various embodiments, this enables PMD 202 to identify the second connection/control communication path as being connected to the same logical accessory as the first connection/control communication path.

In alternative embodiments, accessory 204 can send, via the second control communication path, some other information that associates the second control communication path with the first control communication path. For example, accessory 204 can send a identifier that matches a identifier sent over the first control communication path via the command(s) of block 312. In these embodiments, PMD 202 can compare the identifiers sent over the two control communication paths and determine that they are connected to the same logical accessory. One of ordinary skill in the art will recognize many variations, modifications, and alternatives.

Figure 6:
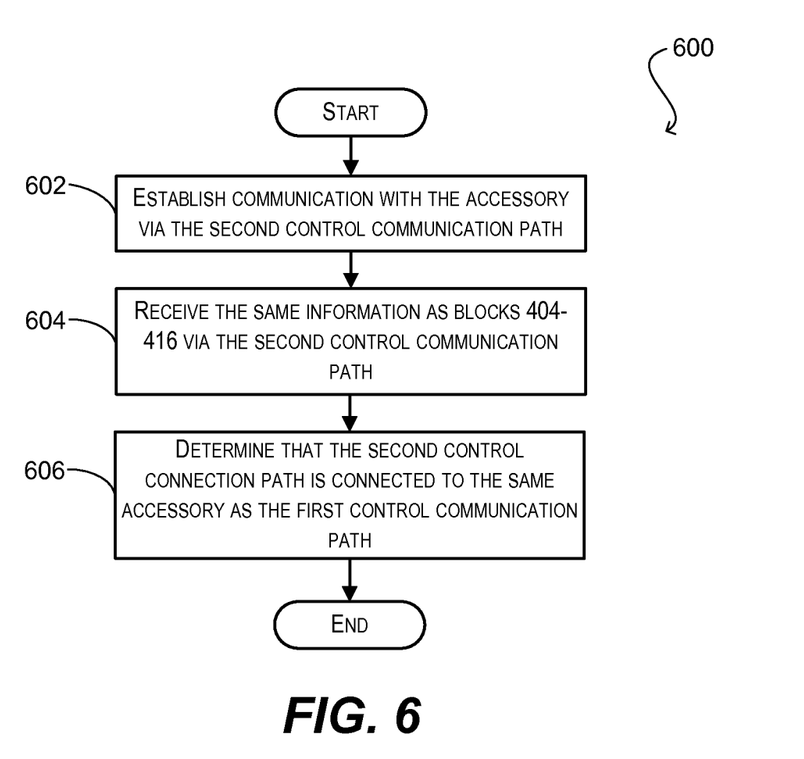
FIG. 6 is a flow diagram of a process performed by a portable media device upon connecting to an accessory via a second connection according to an embodiment of the present invention.

FIG. 6 is a flow diagram of a process 600 that can be performed by PMD 202 upon connecting to accessory 204 via a second connection according to an embodiment of the present invention. In one set of embodiments, process 600 can be performed by PMD 202 while process 500 is being performed by accessory 204. Process 600 can be implemented by PMD 202 in hardware, software, or a combination thereof. As software, process 600 can be encoded as program code stored on a machine-readable storage medium.

At block 602, PMD 202 can connect to accessory 204 via a second connection that is distinct from the first connection made at block 302. This block can be complementary to block 502.

At block 604, PMD 202 can receive, via the second communication path, the same (or substantially the same) information that was received over the first communication path at blocks 404-416 of FIG. 4. For example, PMD 202 can receive the same enumeration of data and control communication paths received at blocks 410 and 412.

At block 606, PMD 202 can compare the enumeration information received at block 604 with the enumeration information received at blocks 410 and 412. Based on that comparison, PMD 202 can determine whether or not the second control connection path is connected to the same accessory (i.e., accessory 204) as the first control communication path. For example, if the enumerated data and control communication paths are exactly the same, PMD 202 can assume that a single logical accessory is reporting this information over two separate control paths. In this manner, PMD 202 can keep track of all of the communication paths that are connected to the same logical accessory.

It should be appreciated that processes 500 and 600 are illustrative and that variations and modifications are possible. For example, steps described as sequential may be executed in parallel, order of steps may be varied, and steps may be modified, combined, added, or omitted. One of ordinary skill in the art will recognize many variations, modifications, and alternatives.

Figure 7:
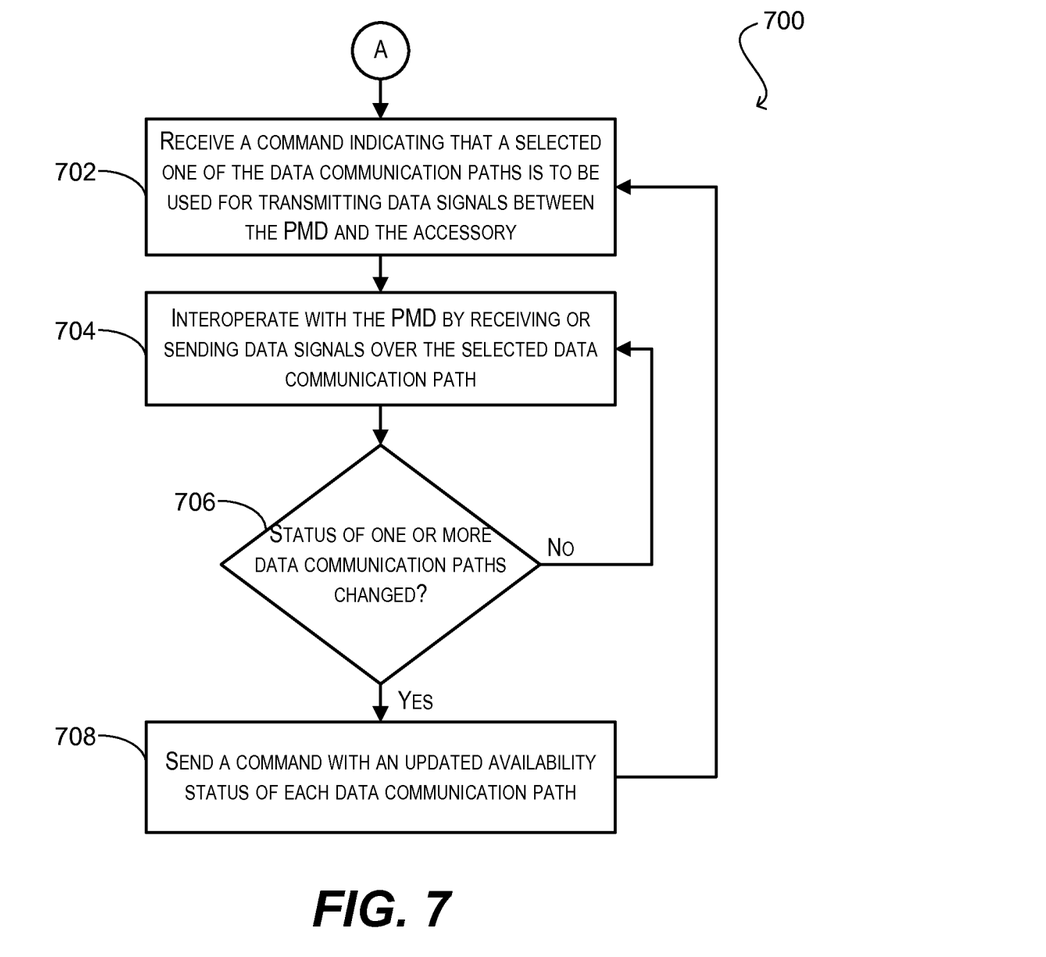
FIG. 7 is a flow diagram of a process performed by an accessory while interoperating with a portable media device according to an embodiment of the present invention.

FIG. 7 is a flow diagram of a process 700 that can be performed by accessory 204 while interoperating with PMD 202 according to an embodiment of the present invention. In one set of embodiments, process 700 can be a continuation of process 300, and can be performed by accessory 204 after it has completed the initialization process of process 300. Process 700 can be implemented by accessory 204 in hardware, software, or a combination thereof. As software, process 700 can be encoded as program code stored on a machine-readable storage medium.

At block 702, accessory 204 can receive a command from PMD 202 indicating that a selected one (or more) of the data communication paths is to be used for exchanging data signals (e.g., audio, video, etc.) between the accessory and the PMD. For example, with respect to the embodiment of FIG. 2, the command can indicate that an audio communication path included in connection 218 will be used for routing an audio stream from PMD 202 to accessory 204. In one embodiment, the command can reference the selected path by the enumeration index provided at block 310 of FIG. 3.

In some embodiments, the command received at block 702 can identify only the selected path. In other embodiments, the command can include references to all of the data communication paths, with a particular value assigned to the selected path to specify its selected status. In a particular embodiment, the command can identify multiple data communication paths as active paths for exchanging data signals between accessory 204 and PMD 202.

At block 704, accessory 204 can interoperate with PMD 202 by receiving and/or sending data signals over the selected data communication path.

While the accessory and PMD are interoperating, accessory 204 can detect whether the availability status of one or more communication paths has changed (block 706). For example, accessory 204 may detect that connection 218 has failed or otherwise become unavailable (e.g., disconnected, etc.). If such a change is detected, accessory 204 can send a command to PMD 202 that is similar to the command sent at block 316 and that includes an updated availability status of each data communication path. In this manner, PMD 202 can be kept up-to-date of the status of all communication paths and can make routing decisions accordingly. For example, if a data communication path included in connection 218 was previously being used and subsequently becomes unavailable, PMD 202 can select a new data connection path for routing data to accessory 204 and can inform accessory 204 of the newly selected path. The PMD and accessory can then act in synchronization with respect to the newly selected path.

Process 700 can continue indefinitely until, for example, PMD 202 and accessory 204 become completely disconnected, or until PMD 202 closes the application that requires interoperation with accessory 204.

It should be appreciated that process 700 is illustrative and that variations and modifications are possible. For example, although process 700 describes the routing of data signals over one or more selected data communication paths, process 700 can be easily adapted to route control signals over one or more selected control communication paths between accessory 204 and PMD 202. Further, steps described as sequential may be executed in parallel, order of steps may be varied, and steps may be modified, combined, added, or omitted. One of ordinary skill in the art will recognize many variations, modifications, and alternatives.

Figure 8:
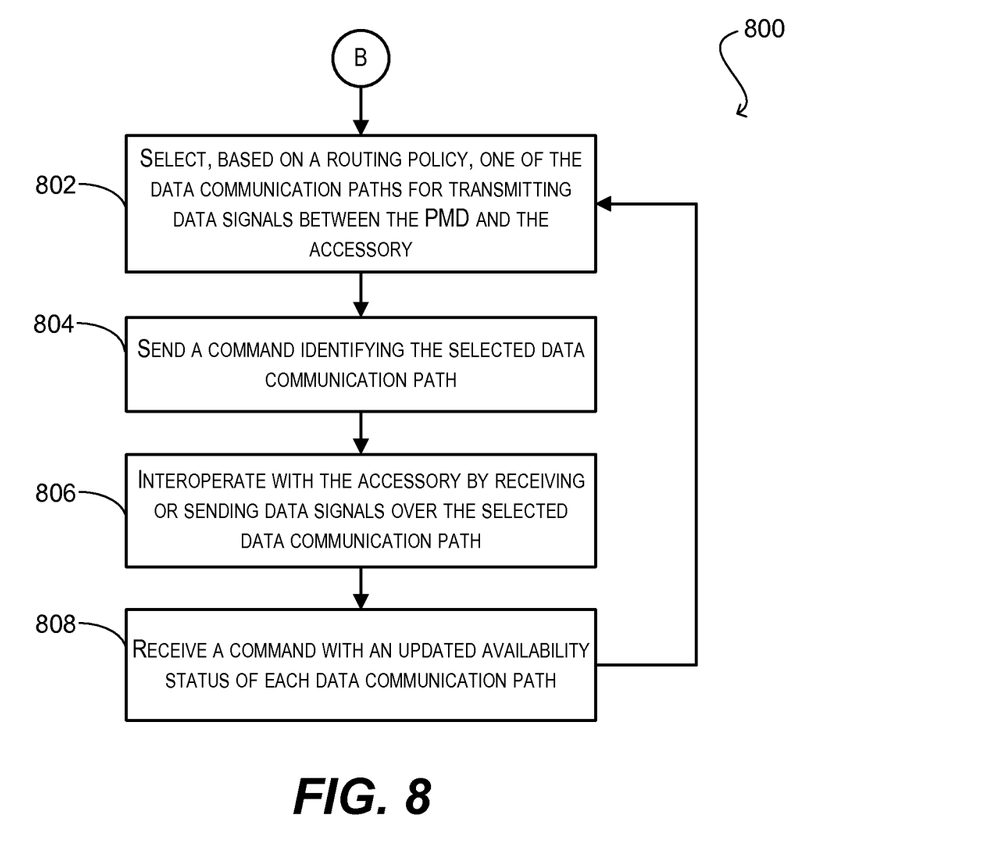
FIG. 8 is a flow diagram of a process performed by a portable media device while interoperating with an accessory according to an embodiment of the present invention.

FIG. 8 is a flow diagram of a process 800 that can be performed by PMD 202 while interoperating with accessory 204 according to an embodiment of the present invention. In one set of embodiments, process 800 can be a continuation of process 400, and can be performed by PMD 202 after it has completed the initialization process of process 400. In a particular embodiment, process 800 can be performed by PMD 202 while process 700 is being performed by accessory 204. Process 800 can be implemented by PMD 202 in hardware, software, or a combination thereof. As software, process 800 can be encoded as program code stored on a machine-readable storage medium.

At block 802, PMD 202 can select, based on a routing policy, one or more of the data communication paths enumerated at block 410 of FIG. 4 for routing data signals (e.g., audio, video, etc.) to/from accessory 204. In one set of embodiments, this selection can take into account the current availability status of each data communication path and whether or not a particular path is preferred by the accessory.

At block 804, PMD 202 can send a command to accessory 204 identifying the selected data communication path. In one set of embodiments, this command can correspond to the command received by the accessory at block 702 of FIG. 7.

Once PMD 202 has selected a data communication path, PMD 202 and accessory 204 can interoperate by exchanging data signals over the selected path (block 806). If the status of one of the data communication paths changes, PMD 202 can receive a command from accessory 204 indicating an updated availability status of each path (block 808). In one set of embodiments, this command can correspond to the command sent by accessory 204 at block 708. PMD 202 can then, e.g., select a new data communication path, or continue interoperating with accessory 204 using the currently selected path. Process 800 can continue indefinitely until, for example, PMD 202 and accessory 204 become completely disconnected, or until PMD 202 closes the application that requires interoperation with accessory 204.

It should be appreciated that process 800 is illustrative and that variations and modifications are possible. For example, steps described as sequential may be executed in parallel, order of steps may be varied, and steps may be modified, combined, added, or omitted. One of ordinary skill in the art will recognize many variations, modifications, and alternatives.

While the invention has been described with respect to specific embodiments, one skilled in the art will recognize that numerous modifications are possible. In some embodiments, circuits, processors, and/or other components of a PMD and/or accessory may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on. Further, while the embodiments described above may make reference to specific hardware and software components, those skilled in the art will appreciate that different combinations of hardware and/or software components may also be used and that particular operations described as being implemented in hardware can also be implemented in software or vice versa.

Computer programs incorporating some or all features described herein may be encoded on various machine-readable storage media; suitable media include magnetic disk (including hard disk) or tape, optical storage media such as compact disk (CD) or DVD (digital versatile disk), flash memory, and the like. Machine-readable storage media encoded with the program code may be packaged with a compatible device or provided separately from other devices. In addition, program code may be encoded and transmitted via wired, optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

What is claimed is:

1. A method for facilitating communication between an accessory and a portable media device, the accessory supporting a plurality of control communication paths and a plurality of data communication paths to the portable media device, the method comprising, by the accessory:

sending, to the portable media device via the first one of the control communication paths, a first command including a total number of control communication paths and a total number of data communication paths supported by the accessory;

sending, to the portable media device via the first one of the control communication paths, one or more second commands enumerating the plurality of data communication paths;

sending, to the portable media device via the first one of the control communication paths, a third command indicating an availability status of each data communication path; and receiving, from the portable media device, a fourth command indicating one or more of the data communication paths selected by the portable media device to be used for communicating data signals between the portable media device and the accessory.

2. The method of claim 1 further comprising:

subsequently to receiving the fourth command, interoperating with the portable media device, wherein the interoperating includes at least one of:

sending a data signal to the portable media device using the selected one or more of the data communication paths, or receiving a data signal from the portable media device using the selected one or more of the data communication paths.

3. The method of claim 1 further comprising:

sending, to the portable media device via the first one of the control communication paths, one or more fifth commands enumerating the plurality of control communication paths.

4. method of claim 1 further comprising:

sending, to the portable media device via the first one of the control communication paths, a fifth command identifying the first one of the control communication paths as the current control communication path.

5. The method of claim 1 wherein the first one of the control communication paths is provided via a first connection between the accessory and the portable media device, wherein a second one of the control communication paths is provided via a second connection between the accessory and the portable media device, and wherein the method further comprises, by the accessory upon connecting to the portable media device via the second connection:

sending, to the portable media device via the second one of the control communication paths, the one or more first commands enumerating the plurality of data communication paths.

6. The method of claim 5 further comprising:

sending, to the portable media device via the second one of the control communication paths, a fifth command identifying the second one of the control connections paths as the current control communication path.

7. A method for facilitating communication between a portable media device and an accessory, the portable media device supporting a plurality of control communication paths and a plurality of data communication paths to the accessory, the method comprising, by the portable media device:

receiving, from the accessory via a first one of the control communication paths, a first command including a total number of control communication paths and a total number of data communication paths supported by the accessory;

receiving, from the accessory via the first one of the control communication paths, one or more second commands enumerating the plurality of data communication paths;

receiving, from the accessory, via the first one of the control communication paths a third command indicating an availability status of each data communication path; and sending, to the accessory, a fourth command indicating one or more of the data communication paths selected by the portable media device to be used for communicating data signals between the portable media device and the accessory.

8. The method of claim 7, further comprising
receiving, from the accessory via a second one of the control communication paths, the one or more second commands enumerating the plurality of data communication paths; and
determining that the first one of the control communication paths and the second one of the control communication paths are connected to the same accessory.

9. The method of claim 7 further comprising, prior to sending the fourth command:
identifying the selected one or more of the data communication paths based on a routing policy.

10. The method of claim 9 wherein the routing policy is configured to take into account the availability status of each communication path.

11. An accessory comprising:
a first accessory port configured to connect with a first media device port of a portable media device, wherein connection of the first accessory port with the first media device port provides a first control communication path and a first data communication path between the accessory and the portable media device;
a second accessory port configured to connect with a second media device port of the portable media device, wherein connection of the second accessory port with the second media device port provides a second data communication path between the accessory and the portable media device; and
a control component configured to, upon establishment of a connection between the first accessory port and the first media device port:
send, to the portable media device via the first control communication path, one or more first commands enumerating the first and second data communication paths;
send, to the portable media device via the first control communication path, one or more second commands including, for each of the first and second data communication paths
an availability status for the path; and
receive, from the portable media device via the first control communication path, a third command indicating one or more communication data paths selected by the portable media device to be used for communication between the portable media device and the accessory.

12. The accessory of claim 11 wherein the control component is further configured to, upon establishment of a connection between the second accessory port and the second media device port:
send, to the portable media device via a second control communication path between the second accessory port and the second media device port, the one or more first commands enumerating the first and second data communication paths.

13. The accessory of claim 11 wherein the accessory comprises a first device and a second device that is physically separate from the first device, wherein the first device includes the first accessory port, and wherein the second device includes the second accessory port.

14. The accessory of claim 11 wherein the connection between the first accessory port and the first media device port is a wired or a wireless connection.

15. A portable media device comprising:
a storage component for storing a plurality of media assets;
a first media device port configured to connect with a first accessory port of an accessory, wherein connection of the first media device port with the first accessory port provides a first control communication path and a first data communication path between the portable media device and the accessory;
a second media device port configured to connect with a second accessory port of the accessory, wherein connection of the second media device port with the second accessory port provides a second data communication path between the portable media device and the accessory; and
a control component configured to:
receive, from the accessory via the first control communication path, one or more first commands enumerating the first and second data communication paths;
receive, from the accessory via the first control communication path, one or more second commands including, for each of the first and second data communication paths
an availability status for the path; and
send, to the accessory via the first control communication path, a third command indicating one or more communication data paths selected by the portable media device to be used for communication between the portable media device and the accessory.

16. The portable media device of claim 15 wherein the control component is further configured to:
identify, based on a routing policy, a selected one of the first and second data communication paths for communicating data signals between the portable media device and the accessory.

* * * * *